Dec. 3, 1963 J. P. WOODS ETAL 3,113,265

METHOD AND MEANS OF ELECTRICAL PROSPECTING USING ANALOG MODELS AND ELECTRODE IMPEDANCE CANCELLING APPARATUS

Filed Nov. 28, 1958 4 Sheets-Sheet 1

ATTEST
Charles F. Steininger

INVENTORS:
John P. Woods.
Edwin B. Neitzel.
Morris F. Gillett.
Josiah J. Godbey.
BY
ATTORNEY Roland F. Bird ATTEST
Charles F. Steininger INVENTORS:
John P. Woods.
Edwin B. Neitzel.
Morris F. Gillett.
Josiah J. Godbey.
BY
ATTORNEY [signature]

ATTEST
Charles F. Staininger

INVENTORS:
John P. Woods.
Edwin B. Neitzel.
BY Morris F. Gillett.
Josiah J. Godbey.
ATTORNEY Robert E. Birch ATTEST
Charles F. Steininger INVENTORS
John P. Woods.
Edwin B. Neitzel.
BY Morris F. Gillett.
Josiah J. Godbey.
ATTORNEY Norbert E. Bird United States Patent Office 3,113,265

Patented Dec. 3, 1963

3,113,265

METHOD AND MEANS OF ELECTRICAL PROSPECTING USING ANALOG MODELS AND ELECTRODE IMPEDANCE CANCELLING APPARATUS

John P. Woods, Morris F. Gillett, and Edwin B. Neitzel, Dallas, and Josiah J. Godbey, Richardson, Tex., assignors to The Atlantic Refining Company, Philadelphia, Pa., a corporation of Pennsylvania Filed Nov. 28, 1958, Ser. No. 776,991

15 Claims. (Cl. 324—1)

This invention relates to a method and a means for investigating subsurface earth formations. More particularly, this invention relates to electrical prospecting by utilizing a new and novel method and means for making electrical measurements at the earth's surface as alternating current of various frequencies is introduced into the earth and obtaining therefrom valuable information relating to the presence and characteristics of subsurface anomalies.

The art of electrical prospecting itself is old and is based on the well-known physical principle that rocks possess three fundamental electrical properties. (1) The electrochemical property is determined by the chemical composition of the rock formation and the composition and concentration of electrolytes dissolved in the ground water contacting the rock. Electrochemical activity is the basis for self-potential methods of prospecting, as it determines the magnitude and sign of the voltage developed when the rock is in equilibrium with an electrolyte. (2) The resistive property or resistivity of the rock formation determines the amount of current that passes through the formation when a specified potential difference is applied at the surface. Basically, there is no consistent difference between resistivities of igneous, sedimentary, and metamorphic rocks; however, the resistivity of certain rocks, such as porous, sedimentary formations (i.e., sands, gravel, etc.), will vary according to the electrolyte concentration of the liquid filling the interstices within the formation. The resistivity of all types of rocks will vary greatly in the presence of mineral deposits, since minerals themselves vary widely in the range of resistivity (i.e., silver $10^{-6}$ ohms-centimeter, and sulfur $10^{17}$ ohms-centimeter). (3) The dielectric property or dielectric constant of the rock indicates the capacity of the formation to store an electric charge. This property varies from about 6 electrostatic units in hard rock to about 50 electrostatic units in wet soils and clay.

The above mentioned properties have long been utilized in various ways, by different electrical prospecting techniques, to locate, with various degrees of success, certain subsurface formations and mineral deposits. In general, these techniques in the electrical prospecting field are broken down into two main groups. (1) The first group (spontaneous polarization and telluric-current techniques) depends upon the earth's naturally occurring influence fields. (2) The second group (equipotential line, resistivity, electromagnetic and electric transient techniques) requires artificially generated currents at the earth's surface to be directed or induced into the earth.

Both above groups of electrical prospecting techniques have utilized to a certain extent the electrical impedance phenomenon found to exist in the earth's surface and caused by the fundamental electrical characteristics displayed by rock formations. If a section of the earth's surface is placed between electrical terminals, the section may be considered equivalent to an electrical network since it exhibits various amounts of resistance and capacitive and inductive reactance, depending upon the type of subsurface formation present. As in an electrical network, the transfer impedance of a section of earth can be determined in various well-known ways. It is the measurement and utilization of this electrical impedance phenomenon and its components to which the present invention is directed.

Generally speaking, early electrical prospecting methods utilized A.C. or pulsating D.C. as their investigatory current; and it was not until rather recently that the operating frequency was varied during the survey to effect a more detailed effective penetration of the area being prospected.

One recently developed electrical prospecting method, disclosed in U.S. Patent 2,766,421, determines the mineralization of a subsurface medium by observing the variations of conductivity and dielectric constant as the frequency of the input current is varied. This method is limited to the location of highly conductive materials at shallow depths. The above patent and the prior art are unable to detect large or small rock anomalies (as opposed to highly conductive mineral bodies). In addition, their depth of investigation is very limited and they are unable to define the size, shape, type or dip of the bodies they can locate. Because of the prior art's limited depth of investigation and the inability to locate and identify various rock anomalies, electrical prospecting has not been useful in the search for oil. Even structural or stratigraphic traps within the range of electrical prospecting means go undetected by present day devices, much less the smaller anomalies or a portion thereof which many times indicate the presence of structural or stratigraphic traps. To date only the expensive and time consuming seismic methods have been used in locating anomalies such as faults, pinchouts, salt domes, etc. However, even these methods have been unsuccessful in locating most stratigraphic traps which petroleum geologists believe house most of the remaining undiscovered oil in the United States.

It is an object of this invention to provide a method and apparatus for locating and characterizing subsurface anomalies by the use of electrical prospecting measurements.

Another object of this invention is to provide a method and apparatus for utilizing electrical prospecting measurements to locate and characterize oil bearing formations.

An additional object of the invention is to provide a method and apparatus for measuring electrical impedance phenomenon or components thereof.

Another object of the invention is to provide an electrical prospecting method and apparatus with and increased depth of investigation and capable of measuring transfer impedance or components thereof to three significant figures.

Another object is to provide an electrical prospecting method and apparatus for detecting small subsurface anomalies.

An additional object of this invention is to provide an electrical prospecting method and apparatus for detecting rock anomalies as opposed to highly conductive mineral anomalies.

Another object of this invention is to provide an electrical prospecting method and apparatus for defining the size, shape, type, depth and dip of subsurface anomalies.

Another object of this invention is to provide a method and apparatus for overcoming errors due to large coupling impedance in electrical measurements by effectively canceling the coupling impedance.

An additional object of this invention is to provide a method and means, usable with conventional electrical prospecting measuring devices, to effectively cancel stake impedance so that the true earth impedance is measured and the effective depth of penetration is increased.

Another object of this invention is to provide an electrical prospecting method and apparatus for measuring, plotting and comparing the vector loci or any component thereof.

Other objects and advantages of this invention will be apparent during the course of the following description made in connection with the accompanying drawings, in which:

FIGURE 1 shows a conventional, four-terminal, electrical network which is representative of a section of the earth's surface.

FIGURE 2*a* is the transfer impedance vector locus of FIGURE 1 for frequencies of 0 to 1,000.

FIGURE 2*b* shows a typical amplitude response curve of a transfer impedance as the frequency is varied.

FIGURE 2*c* shows a typical phase response curve of a transfer impedance as the frequency is varied.

FIGURE 2*d* shows a typical resistive or in phase response curve of a transfer impedance as the frequency is varied.

FIGURE 2*e* shows a typical reactive or out of phase response curve of a transfer impedance as the frequency is varied.

Figure 5A:
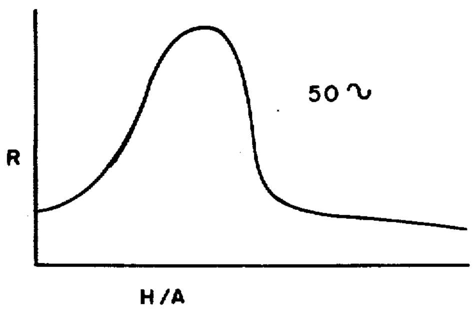

FIGURE 5*a* shows a typical curve of resistance versus ratio of depth to spread distance that may be found in a catalog of curves developed from earth models.

Figure 5B:
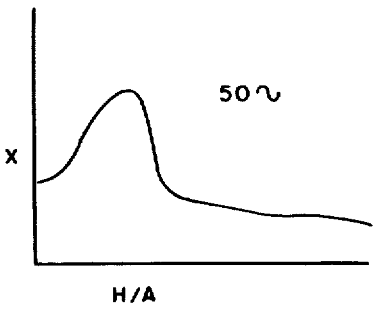

FIGURE 5*b* shows a typical curve of reactance versus ratio of depth to spread distance that may be found in a catalog of curves developed from earth models.

Figure 6:
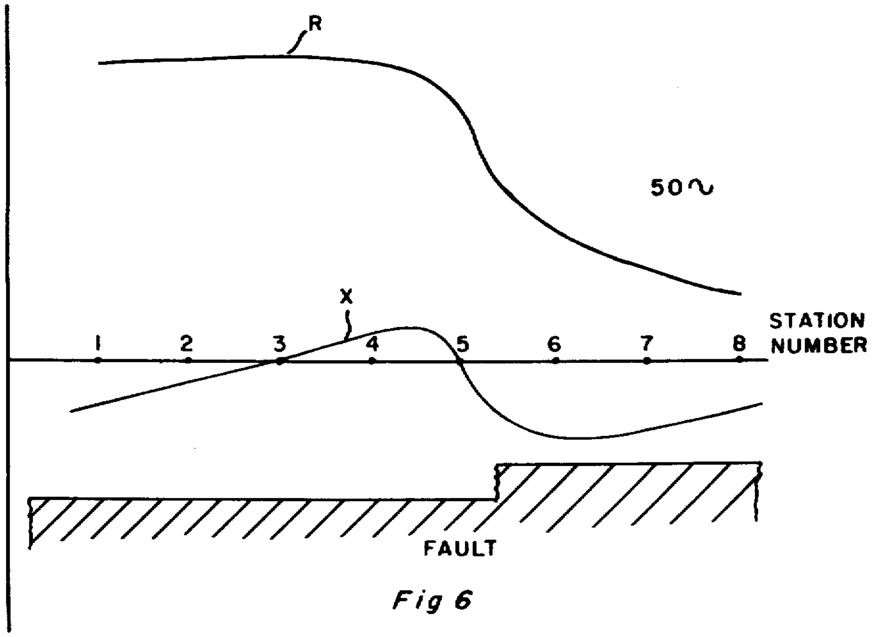

FIGURE 6 shows two typical curves, resistance (R) and reactance (X) plotted versus station number, that may be found in a catalog of curves developed from earth models representing a fault.

Before discussing applicants' invention, it is felt that a brief introduction and a definition of terms will aid in understanding the discussion.

The term, "catalog of curves," is used to describe a particular group of curves created by plotting desired electrical measurements made on models representative of any desired subsurface earth formations. The construction and measurement of the electrical characteristics of such models is well known in the art and will not be elaborated on except to describe the type of models that applicants used in their experiments. It should be understood, however, that the scope of the invention is no way limited by the type of earth models used. Various type subsurface conditions were simulated by the use of two and three dimensional models. One form of three dimensional model used included a lead section representing a homogenous earth area and a copper section representing a highly conductive area. A graphite section was used to represent a nonconductive area. The copper section was positioned as a marker bed to simulate various subsurface anomalies, such as faults, pinchouts, etc. The electrical scale of the models was calculated to enable applicants to determine the depth of lead require to simulate a certain depth of a particular homogenous earth, etc. The frequencies of the investigatory current used in measuring the various earth models were appropriately scaled from frequencies that could be used in earth measurements. Various electrical measurements were made along the surfaces of such models to produce curves such as shown FIGURES 5*a* and 5*b* to build up various type catalogs. Catalogs covering more complex subsurface formations were made, but for purposes of explanation the simple formations will be discussed.

To produce the type of catalog of curves showing the characteristic changes of a transfer impedance component (resistivity) as a certain type anomaly is encountered during a traverse along a number of ground stations, the following basic steps were utilized. A certain resistivity contrast (between the homogenous and marker structure) was made, the copper marker bed positioned at a depth simulating a certain earth depth, a particular anomaly (i.e., a fault as in FIGURE 6) constructed below station number 5 and a certain spread distance determined. This information, including the scaled frequency at which the measurements were made, was recorded as a legend on the curve. A resistivity measurement was then made at each station number along the model (at the prescribed frequency) and plotted against the ground station number. After the measurements were made along the model, the depth of the ground was varied by milling off a prescribed portion of the lead. The model was then remeasured and a new curve plotted. This was continued until the desired model curves were constructed and measured. Other transfer impedance components, such as reactance, phase and amplitude, with various structural ratios were also plotted and classified in different catalogs. Curves, such as shown in FIGURE 6, were constructed from similar type earth models. Although three dimensional models were utilized in the majority of experiments, two dimensional models utilizing sheets of aluminum with air gaps to simulate marker beds were also used in some cases. It is obvious that other type catalogs could be constructed to show the desired information for a particular situation. The scope of the invention is not meant to be limited by the types of catalogs used in the specification for illustrative purposes.

The term, "earth section," is used to designate the portion of the earth between the measuring electrodes; and the term, "station number," is used to designate a particular earth section. In other words, during a traverse, i.e., the path along the surface of the earth being explored, a number of earth sections will be measured; and each section will have a station number.

The term, "transfer impedance component," can be any measurable quantity making up the transfer impedance plot, i.e., phase, amplitude, resistance and reactance.

Briefly described, the invention consists of a method and means for locating and identifying subsurface enomalies, such as faults, pinchouts, reefs, etc., by measuring, plotting, and comparing the effect of frequency variations on the transfer impedance (or one of its components) of sections of the earth's surface. At each section of the traverse prospected the voltage is measured across the earth section and compared vectorially with the current flowing from the power or current generator. Applicants have discovered that by comparison of the characteristics of this voltage current relationship, geological information heretofore unobtainable by electrical prospecting means is readily acquired. For instance, if the transfer impedance vector loci of various earth sections are of the same configuration and size, the subsurface is homogenous. However, if there is a variation in the shape or size of the loci, then a subsurface anomaly of some type is indicated at the point of variation. If desired, the anomaly can be further identified as to depth, size, type, etc., by comparison with appropriate model curves selected from catalogs of model curves. To improve the accuracy of measurements and the effective depth of exploration applicants have also invented a novel method and apparatus for canceling coupling or stake impedance.

Figure 1:
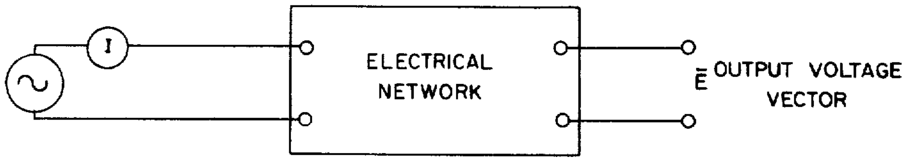
Figure 2A:
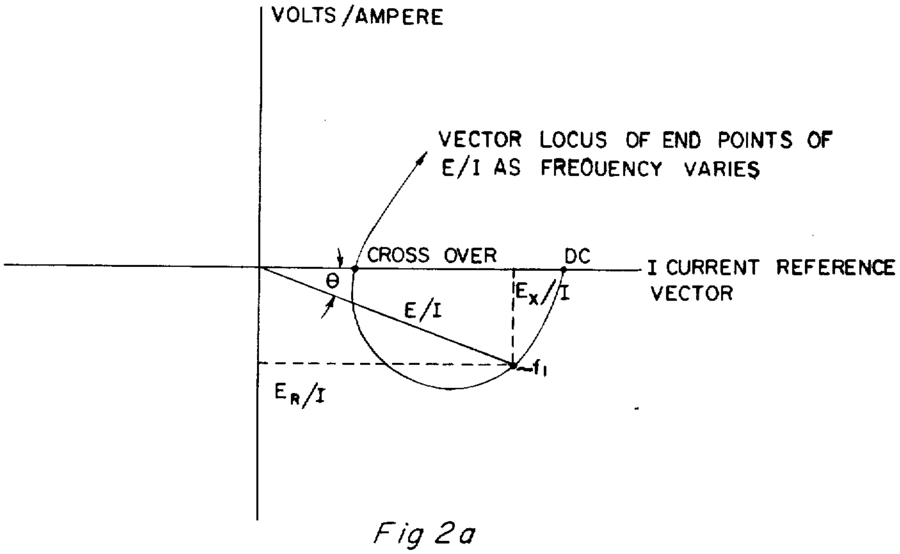
Figure 2B:
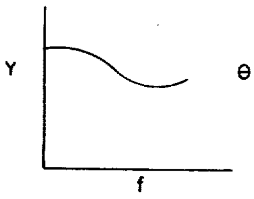
Figure 2C:
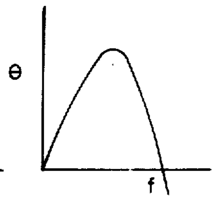
Figure 2D:
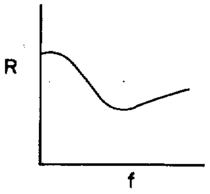
Figure 2E:
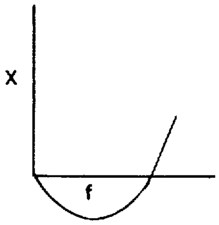

Referring now to the drawings, FIGURE 1 is a hypothetical circuit which represents a section of the earth's surface. If alternating current is allowed to flow into a network containing resistive and reactive components, the voltage across the output of the network compared to the input current varies when the frequency of the alternating current is varied. FIGURE 2*a* shows a vector plot of the transfer impedance $E/I$ and its relation to the current in the hypothetical four-terminal network of FIGURE 1, as the frequency is varied from D.C. to 1,000 c.p.s. The vector locus shown in FIGURE 2*a* illustrates the quantities that will describe the voltage-current relationship as the frequency is varied. The output voltage $\overline{E}$ has an amplitude that is related to the current and also has a phase-angle relationship, $\theta$, with the current. Any point of the vector locus obtained by varying the frequency of I can be described with respect to the current I by determining the quantities $E/I$ and the angle $\theta$ where $E/I$ is the transfer impedance of the network and $\theta$ is the phase angle relation of E to the reference current I. The various points on the vector locus may also be described in terms of two transfer impedance components; namely that component of $\overline{E}$ which is in phase with I and that component of $\overline{E}$ that is 90° out of phase with I. That component which is in phase with I is termed the resistive component of the transfer impedance and is indicated by $E_r/I$, and that component which is 90° out of phase with I is referred to as the reactive component of the transfer impedance and is designated $E_x/I$. Thus, $$E_r/I = E/I \cos \theta$$

and $$E_x/I = E/I \text{ sine } \theta$$

The vector locus as described here may then be defined as the line joining the end points of the transfer impedance vector $E/I$ at different frequencies. The knowledge of this vector locus phenomenon is not in itself new, but the applicants have discovered a novel method of utilizing various vector loci taken along the surface of the earth to provide subsurface information heretofore unobtainable from electrical prospecting techniques and not limited to the location of large deposits of highly conductive materials at shallow depths.

The use of applicants' method and apparatus does not depend upon any specific electrode (or loop) spacing or configuration but may include any of the known electrode (or loop) arrangements heretofore employed in electrical prospecting. However, it should be pointed out that the general shape of the vector locus may change if the spread geometry or dimension of the electrode (or loop) spacing is changed. It is therefore important to be consistent in the type of configuration used in a particular survey.

The type of electrodes employed is also immaterial so long as intimate contact with the earth is maintained, and the dimensions of this contact are assumed small compared to the distance between electrodes. A satisfactory method of making this connection is to drive a steel rod about three-quarter inch in diameter into the ground to a depth of about three feet. The electrical connection is made to the exposed end of this rod or stake. Cables used to make the connections between stakes and instruments are electrical conductors insulated electrically from the ground.

Figure 3:
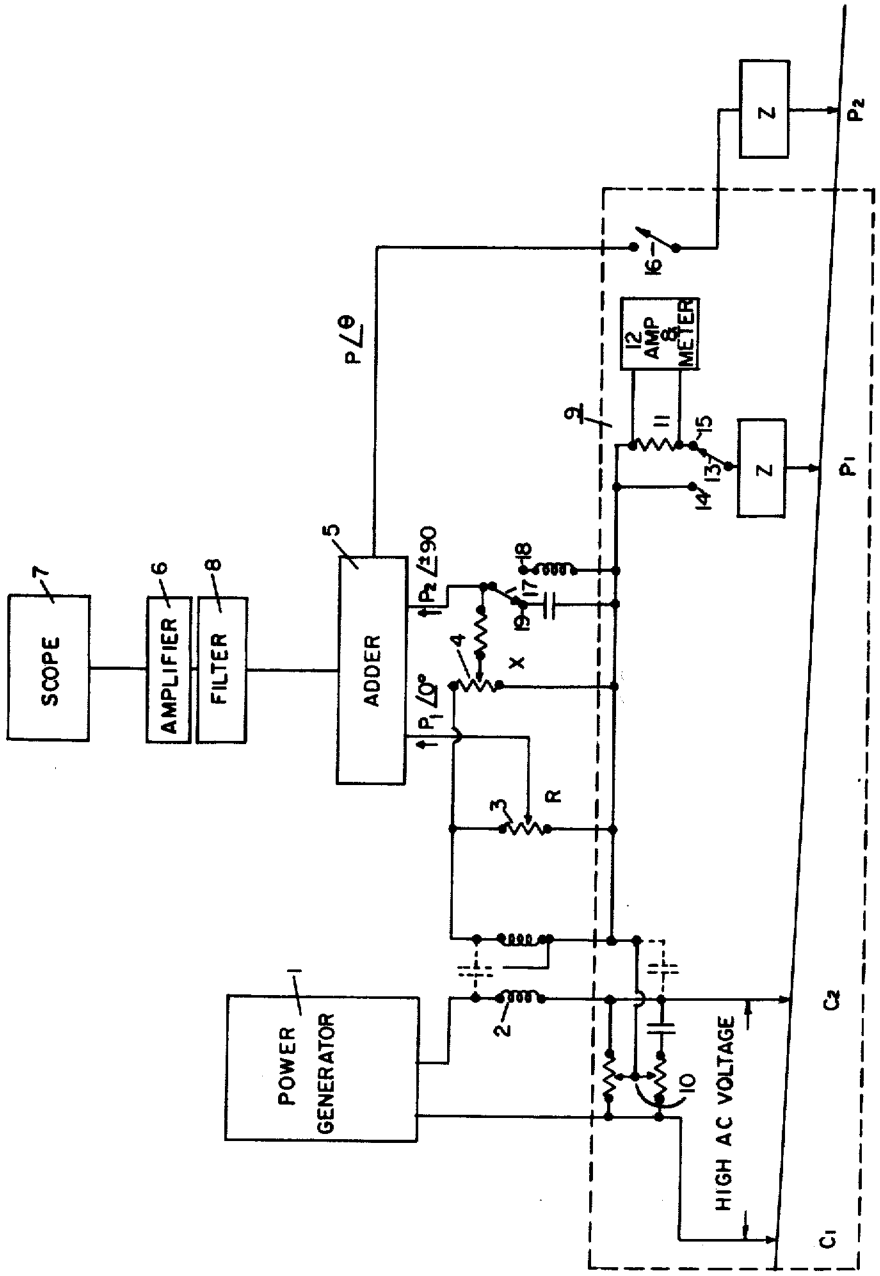
FIGURE 3 is a circuit diagram showing a transfer impedance measuring device and applicants' novel electrode impedance canceling circuit.

FIGURE 3 shows one type of voltage measuring device using applicants' novel stake impedance canceling circuit. The improved circuit is designated by the dotted block labeled 9. The complete apparatus shown in FIGURE 3 includes the following elements: (1) A variable frequency power generator 1 to supply current to the current electrodes, $C_1$ and $C_2$, at a frequency that can be varied over the desired frequency range. A frequency range from 1 to 1,000 cycles per second is typical, although conditions of geology, spread geometry, and spread dimensions could alter the frequency range for a given survey. (2) Electrical circuits that permit the measurement of the potential between the potential electrodes $P_1$ and $P_2$. This potential or voltage measuring circuit consists of a shielded type air core transformer 2, or may be a vacuum tube resistor arrangement. Such measuring circuit should be designed so that the voltage amplitude is measured in terms of, or can be converted to, voltage per unit current (impedance); and the phase relationship between the potential across potential electrodes $P_1$ and $P_2$ and the current into current electrodes $C_1$ and $C_2$ can be determined by a bridge circuit including potentiometers 3 and 4 and adder 5 and switch 17 including contacts 18 and 19. (3) A detection circuit, including amplifier 6 and scope 7, that amplifies the small signal voltages in the voltage measuring circuits to a value sufficient so they can be shown on an indicator such as scope 7. Instead of scope 7, a meter, ear phones, recorder, automatic plotter, etc., may also be used. (4) Filters 8, or other means to discriminate against interference, noise, or other undesirable signals. (5) Stake impedance canceling circuit 9, which prevents erroneous readings. Elimination of errors due to stake impedance results in a greater effective depth of penetration for mapping.

*Stake Impedance Cancelation*

Improved stake impedance cancelation circuit 9 comprises a Wagner type ground with adjustable potentiometers 10, a reference electrode $P_1$, current electrodes $C_1$ and $C_2$, a resistor 11, an amplifier-voltmeter combination 12, a switch 13 with contacts 14 and 15 and switch 16.

It is basic that in any situation where there is a large coupling impedance compared to the impedance being measured, considerable error is introduced if the coupling impedance is not someway removed from the circuit or compensated for in the measurements. In electrical prospecting the stake impedance created by the earth surrounding the stake is much larger than the impedance in the earth section being measured. It is recognized that in a conventional electrical prospecting setup some current will flow between the current source and the voltage measuring apparatus. Though small, the power generator (source) current flowing through the voltage measuring stakes will produce a considerable voltage error across the large stake impedance. Heretofore, this voltage error has either been ignored or reduced by utilizing a number of voltage stakes and salting the ground around each stake to reduce the impedance and the resulting voltage error.

Applicants have devised a novel method of completely removing the effect of stake impedance, thus enabling an electrical prospecting apparatus to make accurate measurements of transfer impedance or a component thereof to three significant figures. The resulting increased sensitivity or accuracy of a circuit using applicants' method enables the effective depth of the investigatory current to be greatly increased. Applicant's novel stake impedance canceling method is accomplished by preventing circulating current between the current source and the voltage measuring apparatus. This is done by establishing a voltage reference stake, $P_1$ (i.e., disconnecting other voltage stakes or stake $P_2$ by switch 16), and adjusting the amplitude and phase of the voltage at the reference stake to equal the amplitude and phase of a reference point within the current source.

The stake impedance canceling circuit, shown in block 9 of FIGURE 3, is one device capable of carrying out applicants' novel method. Prior to operating the electrical prospecting device shown in FIGURE 3, the stake impedance canceling circuit 9 is calibrated. This is done by temporarily disconnecting voltage electrode $P_2$ by the use of switch 16. Then to determine the amount of source current flowing between the current source 1, and the voltage measuring device 5, 8, 6 and 7, switch 13 is moved to position 15, placing resistor 11 and meter-amplifier combination 12 in the circuit as shown. Bridge 10 is then adjusted until meter 12 registers zero. This adjustment effectively balances the phase and amplitude of the current at bridge 10 to equal the phase and amplitude across the reference stake $P_1$. The source current no longer flows through $P_1$, and the potential is therefore zero volts. Switch 13 is then moved to position 14, and voltage stake $P_2$ is again connected to the circuit by switch 16.

It should be pointed out that applicants' novel stake impedance canceling method and apparatus are also applicable to other high impedance coupling situations such as measuring the resistivity of oil well cores, etc.

*Impedance Measurements*

The electrical prospecting apparatus is now capable of measuring the true voltage drop between $P_1$ and $P_2$. The device operates in the conventional manner (with the exception that there is no error voltage in the measurement caused by source current flow between the source and the voltage measuring device); and the real and imaginary components of the voltage drop across the ground portion being measured with respect to the source current are determined by the bridge circuit 3, 4, and 5. Potentiometers 3 and 4 are adjusted until a null is obtained at the output of adder 5. The adjustment of potentiometer 3 determines the voltage amplitude of the real component. The adjustment of potentiometer 4 determines the voltage amplitude of the imaginary component. Adding circuit 5 combines the three voltage inputs and produces a null when the adjusting potentiometers are balanced.

For automatic operation bridge 3, 4, and 5 can be made self-balancing by conventional means so that as the frequency of the current from source 1 is varied, potentiometers 3 and 4 are automatically readjusted to produce a null. One form of automatic operation utilizes a recorder plotting on overlay type paper the transfer impedance vector locus (or a component thereof) of the earth section as the frequency is varied. Comparison of loci can be made in various ways, such as, by superimposing one plot on another, by visual comparison, electronic comparison, etc. One type of electronic comparison is the superposition of traces on a cathode ray scanning tube as taught in United States Patent 2,658,579.

The electrical prospecting traverse to be described can be unidirectional or multidirectional.

The transfer impedance measurements or components thereof made during the electrical prospecting traverse can be used to locate subsurface anomalies. In addition to locating anomalies, applicants' novel method of using electrical prospecting measurements is also useful in many other applications, including determining the type of anomaly, the shape or areal extent, the depth at a particular point or the dip of the anomaly, etc. Each application can be accomplished in various ways. A number of applications with various methods of accomplishing them will be discussed to point up the versatility of applicants' invention, after which an illustrative prospecting problem is presented.

*Location*

In locating an anomaly, a series of readings are made from a plurality of earth sections that extend across the area to be investigated. The transfer impedance vector locus, FIGURE 2*a*, of each section is measured and plotted as the frequency is varied from approximately 1 c.p.s. to the desired amount, for instance 300 to 1,000 c.p.s. The plots of the vector loci are then compared (automatically or manually as desired) to determine if subsurface anomalies exist in the area prospected. This vector loci comparison can be accomplished in many different ways to detect and locate subsurface anomalies. The following examples of loci comparison are meant to be illustrative only and in no way tend to limit the scope of the invention:

(1) The entire loci plots can be compared for similarity of configuration and size. If all the plots are alike, then the subsurface under the traverse is homogenous and no anomalies exist.

(2) Another way of comparing the loci is to plot a particular value (identified by a particular frequency) from each locus against the ground station number. The value of frequency is a function of the depth of investigation and is selected for the particular depth of interest. It is immaterial which point or points on the locus are selected; however, once selected, the corresponding point or points from each locus must be used. It should be understood that the more of the locus used for comparison with other loci, the more accurate will be the determination of the subsurface conditions. Examples of points on the locus that could be used for comparison are as follows, though others can be used:

(*a*) Resistive value at 0 (D.C. as extrapolated from low frequency A.C. points on the loci) frequency versus ground station number.

(*b*) Resistive value at crossover frequency versus ground station number.

(*c*) Resistive value of any frequency between extrapolated D.C. and crossover versus ground station number.

(*d*) Reactive value at any of the above frequencies versus ground station number.

(*e*) A combination of values versus ground station numbers.

(*f*) Use of phase or amplitude values instead of resistive or reactive values as shown above.

If the type of comparison utilizing a particular point from each locus is used, then the subsurface area may be homogenous if the plotted points form a straight line. However, if three points widely spread in frequency were measured at each station and if the plotted points still formed a straight line, this insures a homogenous subsurface. A curve in the plotted points, regardless of the points used, indicates a subsurface anomaly at the point of curvature.

*Type*

In determining the type anomaly located, applicants compared their vector loci plots made along the traverse (or the plots of the magnitudes of the particular transfer impedance component measure) with a catalog of curves showing the characteristic curves of the measured component versus station numbers when various type anomalies are encountered. FIGURE 6 shows characteristic curves of resistive and reactive components versus station numbers when a fault is encountered at a frequency of 50 c.p.s. and with a particular spread distance, marker bed depth and resistivity ratio. Thus, after the anomaly has been located as described supra, the plots of the values of the particular component or of the transfer impedance is compared with a catalog of curves made up of the same type component versus station numbers. If the anomaly was located by comparing transfer impedance vector loci and the catalog of characteristic curves is plotted in terms other than the entire impedance vector loci (for example, resistance versus station numbers, etc.), then the appropriate component can be automatically remeasured or determined from the vector locus curve. In other words, if the catalog of characteristic curves is plotted only in terms of resistance, reactance, amplitude or phase angle at a particular frequency, it is possible to pick off the desired component at that frequency from each vector locus. Regardless of how the particular frequency component values are determined, they are compared with a particular set of characteristic curves to identify the type of anomaly located. The above examples of comparing the plots with a catalog of curves are for illustrative purposes only and in no way tend to limit the scope of the invention since other methods of operation are obvious from the disclosure.

*Size*

In determining the size or areal extent of the anomaly, various methods may be utilized. The simplest method is to utilize a component or the entire transfer impedance vector loci comparison in which the traverse is run in various directions from a central point. Other traverse patterns can be used, however, in determining the size of the anomaly. The vector loci comparison traverse is run in one direction until the shape and size of the loci indicate the end of the anomaly. The traverse is then run in other directions until the outline and extent of the anomaly is determined.

*Depth*

In determining the depth of the anomaly at a particular position or the general dip of the anomaly along the traverse, a catalog of curves, such as shown in FIGURE *5a* or *5b*, is used. These figures show two typical model curves in which the measurements have been made in terms of resistance and reactance plotted against the ratio of marker bed depth to spread distance ($H/A$). These curves show the behavior of the resistance and reactance readings at the surface above the particular marker bed as the marker bed's depth is varied. (It should be understood that these models can also be expressed in terms of phase angle, amplitude or transfer impedance vector locus.) The measured value may be plotted versus H instead of ratio $H/A$. As in FIGURE 6, the curves shown in FIGURES *5a* and *5b* are plotted at a particular frequency and with a particular resistivity contrast, spread distance and marker bed depth. In this particular type measurement the curves selected from the catalog of curves are developed from earth models exhibiting a marker bed of uniform thickness, a particular resistivity ratio and marker bed depth corresponding to that of the bed being prospected at the starting point of the traverse. In this case, the dip or depth variation is determined by periodically comparing the appropriate traverse measurements with the selected curve as the traverse moves away from the starting point. As an example, the resistivity value (or the value of the form of measurement used in locating the anomaly) at the catalog curve frequency is measured and compared with the appropriate model curve. The depth of the anomaly at that point can be determined from the equivalent $H/A$ value since A or the spread distance is known. If the resistivity value remains constant, the bed is level; and if the readings increase or decrease, the bed behavior can be determined by comparing the plotted measurements with the catalog curve. If desired, the numerical depth at a particular point can be obtained by solving for H since R and A are known. This type of solution can be obtained automatically by various conventional electrical and mechanical devices well known in the art. In addition, if desired, the curve can be plotted for one value of A so that value of H is placed directly on the graph.

*Specific Example of Over-All Operation*

Figure 4:
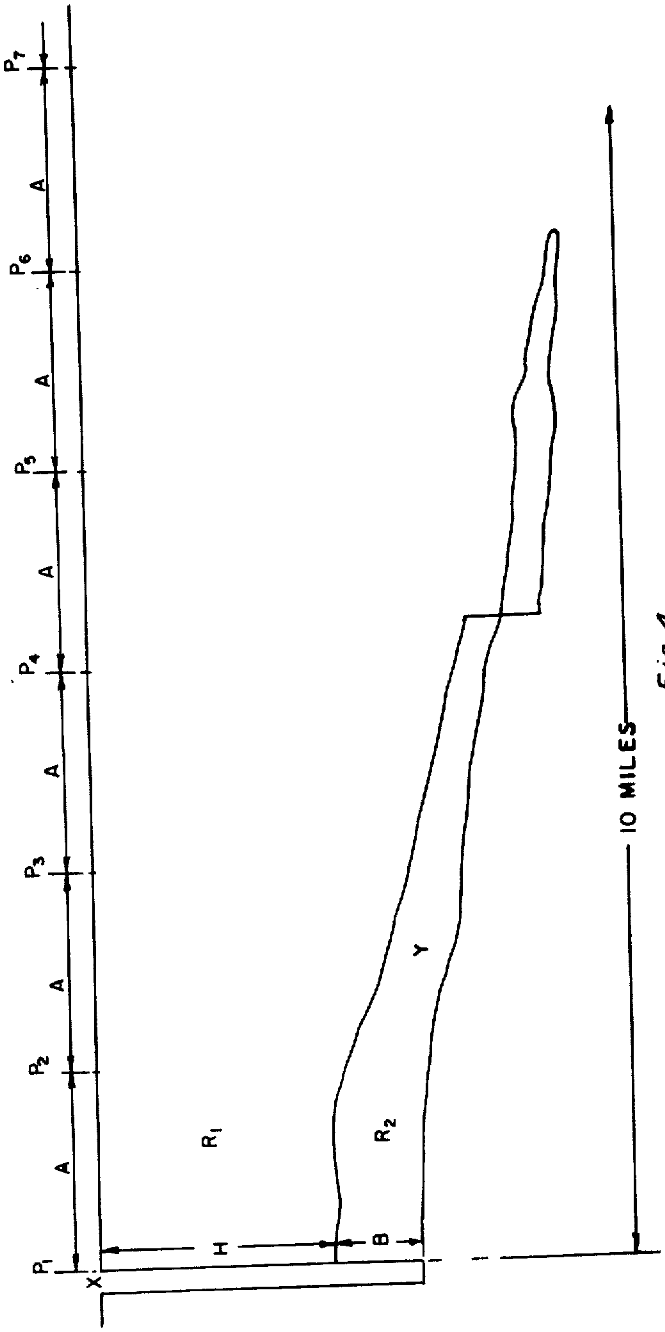
FIGURE 4 is a diagram showing a plurality of earth sections covering a given exploratory area that extends over a marker bed Y.

For a more complete example of a utilization of applicants' novel method, reference is now made to FIGURE 4. Assume marker bed Y extends off to the left of the drawing for several miles and that a portion of the marker bed shown extends over a distance of 10 miles. The spread distance A shown between the various ground sections, $P_1$–$P_2$, $P_2$–$P_3$, $P_3$–$P_4$, etc., is not drawn to scale but is positioned for purposes of illustration only. Assume the presence of a portion of the marker bed Y is known, by virtue of an old resistivity log, core or other source, but the extent and behavior of the bed is not known. A logical examination sequence could be as follows:

(1) From the starting position, X, run a transfer impedance vector loci comparison traverse to determine if anomalies exist in the bed. (A transfer impedance component traverse could be run instead of the vector loci traverse.) The electrode spread distance is determined in the conventional manner (depth to marker bed is known at point X) so that the marker bed is reflected in the impedance loci curves. (By varying the frequency of the investigatory current, the depth of investigation within the zone determined by the spread distance is varied.) The vector locus at each position is measured and compared. The presence of an anomalous condition under ground section $P_4$–$P_5$ is disclosed by the failure of the vector locus from that section to match the vector loci from sections $P_1$–$P_2$, $P_2$–$P_3$, and $P_3$–$P_4$. Another anomalous condition is disclosed by the vector locus made from the measurements of section $P_6$–$P_7$.

(2) The next step is to identify the type of anomalies discovered in step 1. Knowing the resistivity contrast $R_1/R_2$, the depth of the marker bed and its thickness at starting point X, from old records, a core or resistivity log, etc., the proper catalog of characteristic curves, such as shown in FIGURE 6, is selected. As described heretofore, there are several ways in which to determine the type anomaly. If, in step 1 instead of running a complete transfer impedance vector loci traverse to locate anomalies, plots of one component, say, the resistivity magnitudes, as shown in FIGURE *2d*, are made and compared, the catalog frequency resistivity from each ground section is plotted against the station number and compared directly with the catalog of characteristic curves displaying the particular catalog frequency and structural ratio of the initial starting point X. By comparing the plotted values of the resistance at the catalog frequency with the appropriate catalog curves, the type of anomaly under section $P_4$–$P_5$ is determined. One curve in FIGURE 6 shows the behavior of the resistive values at a frequency of 50 cycles as the traverse moves over a fault. The determination of a pinchout under interval $P_6$–$P_7$ can also be determined in the same manner as described above. Probably the most simplified and direct method is to detect the anomalies in step 1 by measuring, say, a single resistivity at each ground section using the frequency of the characteristic curve. The resulting measurements plotted against station numbers disclose an anomaly if the plot is not a level, straight line. This same plot is then compared directly with the appropriate characteristic curve to determine the type of anomaly.

When the anomalies are located in step 1 by comparing portions of or the entire transfer impedance vector loci, the type of anomaly may be determined by locating the characteristic curve frequency on the plot, extracting the desired component from each locus curve as described supra, and comparing the components with the appropriate curves as described above. Instead of taking the desired component from each locus, the value could also be remeasured directly in terms of the component at the catalog frequency.

(3) After the anomalies have been located and their type determined, it may be desirable to determine their shape or areal extent. This may be done in several ways as described supra. A series of traverses, such as described in step 1, may be run in a spokelike fashion from reference point X or a series of such traverses may be run from a point above the anomaly. In any case traverses are run in various directions; and the loci are compared until the extent of the anomaly is determined in the various directions.

(4) It may be desirable in some cases to determine if the marker bed Y is level or if it dips. Again, one of the various type readings is made at each earth section along the traverse. If a resistivity measurement is made at, say, a frequency of 50 cycles, the bed is level if the plots form a straight level line. If the plots do not form a straight line, the behavior and dip of the bed may be determined by referring to a catalog of curves such as shown in FIGURES *5a* and *5b*. Assuming the curve selected was made at a frequency of 50 cycles and at the structural ratio of the starting point X, a comparison of the selected curve with the resistivity measurements plotted against the station numbers indicate the general behavior of the bed, i.e., whether it is inclined up or down. If desired, the exact depth under an earth section can be determined by comparing the resistivity value with the selected curve and reading the $H/A$ value. A (spread distance) is always known. The curve may also be made in terms of R versus H where the depth value may be read directly.

The above sequence of operations was given to illustrate some of the uses of applicants' novel method of interpreting electrical prospecting measurements. The examples given are in no way intended to limit the scope or the use of applicants' novel method. Other uses of applicants' method are obvious from the disclosure and are covered by the appended claims.

The above case, in which only one marker bed exists in the subsurface, has been used for simplicity in explaining a use of applicants' invention. However, it should be understood that where there are a number of subsurface beds above the marker bed, the same principles would apply; and the bed thicknesses and depths would effect the anomalous changes in the impedance loci curves in a characteristic manner associated with the particular subsurface anomalous changes.

The improved method and means of using electrical prospecting surveys makes available for the first time all the subsurface information within the range of electrical prospecting methods. With applicants' invention the relatively small anomalies, such as faults, pinchouts, portions of reefs, etc., are locatable and identifiable for the first time with electrical prospecting means. This means structural traps and many stratigraphic traps heretofore undetectable by any geophysical method, except possibly by expensive and time consuming seismic survey or a core hole survey, can now be detected by applicants' fast and inexpensive electrical prospecting method.

We claim:

1. In a method for electrically locating and characterizing subterranean geological characteristics comprising the steps of, (*a*) passing an electrical current at a plurality of frequencies through a plurality of earth sections,
(*b*) measuring the transfer impedance as a function of frequency at each earth section,
(*c*) plotting the measurements of each earth section,
(*d*) comparing the plotted magnitudes of said measured transfer impedance at at least one of said frequencies obtained at one of said sections with at least one other of said sections whereby a subsurface structural anomally is indicated when said compared magnitudes vary,
(*e*) comparing the plotted magnitudes of said measured transfer impedance at a single frequency at all of said sections with previously plotted magnitudes of said transfer impedance obtained from analog models of earth formations at equivalent sections, and
(*f*) identifying at least one physical characteristic of the subterranean geological structural anomaly from predetermined information contained on analog models exhibiting said measured magnitudes similar to said measured magnitudes of said earth sections.

2. In a method for electrically locating and characterizing subterranean geological characteristics comprising the steps of, (*a*) passing an electrical current at a plurality of frequencies through a plurality of earth sections,
(*b*) measuring at least one component of the transfer impedance as a function of frequency,
(*c*) plotting the measurements of each earth section,
(*d*) comparing the plotted magnitudes of said measured component at at least one of said frequencies obtained at one of said sections with at least one other of said sections whereby a subsurface structural anomaly is indicated when said compared magnitudes vary,
(*e*) comparing said plotted magnitudes of said measured component at a single frequency at all of said sections with previously plotted magnitudes of said measured component obtained from analog models of earth formations at equivalent sections, and
(*f*) identifying at least one physical characteristic of the subterranean geological structural anomaly from predetermined information contained on analog models exhibiting said measured magnitudes similar to said measured magnitudes of said earth sections.

3. In a method for electrically locating and characterizing subterranean geological characteristics comprising the steps of, (*a*) establishing a reference coupling voltage at a reference electrode by adjusting phase and amplitude of a potential at a point adjacent a current source to equal the phase and amplitude of a potential across the reference coupling thereby canceling the effect of electrode impedance,
(*b*) passing an electrical current at a plurality of frequencies through a plurality of earth sections,
(*c*) measuring at least one component of the transfer impedance as a function of frequency,
(*d*) plotting the measurements of each earth section, and
(*e*) comparing the plotted magnitudes of said measured component at at least one of said frequencies obtained at one of said sections with at least one other of said sections.

4. In a method for electrically determining subterranean geological characteristics comprising the steps of, (*a*) passing an electrical current at a plurality of frequencies through a plurality of earth sections,
(*b*) measuring at least one component of the transfer impedance as a function of frequency,
(*c*) plotting the measurements of each earth section,
(*d*) comparing the plotted magnitudes of said measured component at a single frequency at all of said sections with previously plotted magnitudes of said measured component obtained from analog models of earth formations at equivalent sections, and
(*e*) identifying at least one physical characteristic of a subterranean geological structural anomaly from predetermined information contained on analog models exhibiting said measured magnitudes similar to said measured magnitudes of said earth section.

5. In a method for electrically locating and characterizing subterranean geological characteristics comprising the steps of, (*a*) establishing a reference coupling voltage at a reference electrode by adjusting phase and amplitude of a potential at a point adjacent a current source to equal the phase and amplitude of a potential across the reference coupling thereby canceling the effect of electrode impedance,
(*b*) passing an electrical current at a plurality of frequencies through a plurality of earth sections,
(*c*) measuring the transfer impedance as a function of frequency,
(*d*) plotting the measurements of each earth section, and
(*e*) comparing the plotted magnitudes of said transfer impedance at at least one of said frequencies obtained at one of said sections with at least one other of said sections.

6. In a method for electrically determining subterranean geological characteristics comprising the steps of, (*a*) passing an electrical current at a plurality of frequencies through a plurality of earth sections,
(*b*) measuring the transfer impedance as a function of frequency at each earth section,
(*c*) plotting the measurements of each earth section,
(*d*) comparing the plotted magnitudes of said transfer impedance at a single frequency at all of said sections with previously plotted magnitudes of said transfer impedance obtained from analog models of earth formations at equivalent sections, and
(*e*) identifying at least one physical characteristic of a subterranean geological structural anomaly from predetermined information contained on analog models exhibiting said measured magnitudes similar to said measured magnitudes of said earth sections.

7. A method for electrically locating and determining geological characteristics comprising the steps of, (*a*) establishing a reference coupling voltage at a reference electrode by adjusting phase and amplitude of a potential at a point adjacent a current source to equal the phase and amplitude of a potential across the reference coupling thereby canceling the effect of electrode impedance, (*b*) passing an electrical current at a plurality of frequencies through a plurality of earth sections, (*c*) measuring at least one component of the transfer impedance as a function of frequency, (*d*) plotting the measurements of each earth section, (*e*) comparing the plotted magnitudes of said measured component at at least one of said frequencies obtained at one of said sections with at least one other of said sections, and (*f*) comparing said plotted magnitudes of said measured component at a single frequency at all of said sections with previously plotted magnitudes of said measured component obtained from predetermined information contained on analog models of earth formations at equivalent sections.

8. A method for canceling coupling impedance in an impedance measuring system wherein a current source is connected to an object whose resistivity is to be measured and a reference electrode and a second electrode can be connected to the object comprising, (*a*) establishing a reference coupling voltage at the reference electrode by adjusting the amplitude and phase of a reference point adjacent the current source to be equal in amplitude and opposite in phase to the voltage developed across the coupling between said reference electrode and the object, (*b*) establishing a second coupling by connecting the second electrode to the object, and (*c*) measuring the voltage difference between said reference coupling and said second coupling.

9. In a method as set forth in claim 8 wherein the reference point adjacent the current source is located in a circuit connecting the current source to the object to be measured.

10. In a voltage measuring system of the class wherein the impedance of the earth's surface between a plurality of electrodes is determined, a stake impedance canceling circuit comprising, (*a*) a reference electrode, (*b*) a voltage measuring means including a detector and a resistor, (*c*) a switching means containing at least two contacts, one of said contacts adapted to connect said reference electrode to said voltage measuring means and a second of said contacts adapted to bypass said voltage measuring means, (*d*) a current source, (*e*) two current electrodes, connected to said current source, (*f*) a bridge circuit means connected across said current electrodes, and (*g*) an output conductor connected to said bridge means and connected in parallel to said contacts in said switching means whereby said reference electrode can be selectively connected to said voltage measuring means and the impedances in said bridge circuit can be adjusted so that zero current flows across said reference electrode.

11. In an apparatus as set forth in claim 10 wherein the bridge circuit includes a Wagner type ground and two potentiometers.

12. In an apparatus as set forth in claim 10 wherein the voltage measuring means includes a resistor in parallel with a meter means.

13. In an apparatus as set forth in claim 10 wherein a second electrode can be connected in parallel to said bridge means by a second switch means.

14. A variable frequency electrical prospecting device for directly measuring transfer impedance comprising, (*a*) a plurality of current electrodes, (*b*) a variable frequency power generator connected to said electrodes, (*c*) a plurality of potential electrodes, (*d*) a stake impedance canceling circuit including an amplitude and phase adjusting circuit and a switching means, said amplitude and phase adjusting circuits connected to said current electrodes and said switching means connected to one of said potential electrodes, (*e*) a measuring circuit adapted to measure real and imaginary components of alternating current, said measuring circuit connected to said current and potential electrodes, and (*f*) a detection circuit connected to said measuring circuit.

15. An apparatus as set forth in claim 14 wherein the measuring circuit is connected to one of the current electrodes by a shielded type air core transformer.

References Cited in the file of this patent

UNITED STATES PATENTS

| | | |
|---|---|---|
| 1,897,688 | Ambronn | Feb. 14, 1933 |
| 2,046,436 | Wascheck | July 7, 1936 |
| 2,104,743 | Herrick | Jan. 11, 1938 |
| 2,149,717 | Pearson | Mar. 7, 1939 |
| 2,293,024 | Klipsch | Aug. 11, 1942 |
| 2,342,676 | Lewis | Feb. 29, 1944 |
| 2,343,140 | Evjen | Feb. 29, 1944 |
| 2,470,839 | Zuschlag | May 24, 1949 |
| 2,547,950 | Lee et al. | Apr. 10, 1951 |
| 2,766,421 | Wait et al. | Oct. 9, 1956 |
| 2,931,972 | Tilley | Apr. 5, 1960 |

OTHER REFERENCES

Heiland: Geophysical Exploration, Prentice-Hall, New York, 1940, pp. 700–701.

Pritchett: A Low Frequency Earth Model, Geophysics, vol. XX, No. 4, October 1955, pp. 860–870.

UNITED STATES PATENT OFFICE

CERTIFICATE OF CORRECTION

Patent No. 3,113,265 December 3, 1963

John P. Woods et al.

It is hereby certified that error appears in the above numbered patent requiring correction and that the said Letters Patent should read as corrected below.

Column 2, line 47, for "and", second occurrence, read -- an --; column 3, line 60, for "require" read -- required --; line 66, after "shown" insert -- in --; column 4, lines 41 and 42, for "enomalies" read -- anomalies --.

Signed and sealed this 9th day of June 1964.

(SEAL)
Attest:

ERNEST W. SWIDER
Attesting Officer

EDWARD J. BRENNER
Commissioner of Patents